United States Patent [19]

Puhl et al.

[11] Patent Number: 4,486,624

[45] Date of Patent: Dec. 4, 1984

[54] MICROPROCESSOR CONTROLLED RADIOTELEPHONE TRANSCEIVER

[75] Inventors: Larry C. Puhl, Sleepy Hollow; John F. Smedinghoff, Schaumburg, both of Ill.

[73] Assignee: Motorola Inc., Schaumburg, Ill.

[21] Appl. No.: 187,304

[22] Filed: Sep. 15, 1980

[51] Int. Cl.³ ............................................. H04M 1/00
[52] U.S. Cl. ................................ 179/2 EB; 179/2 E; 455/77; 455/89
[58] Field of Search ................. 179/2 E, 2 EB, 2 EA; 455/76, 77, 83, 84, 89, 90; 364/200, 900

[56] References Cited

U.S. PATENT DOCUMENTS

| | | | |
|---|---|---|---|
| D. 234,605 | 4/1975 | Larson | D14/53 |
| 3,458,664 | 7/1979 | Adlhoch et al. | 179/2 EB |
| 3,571,519 | 3/1971 | Tsimbidis | 179/2 EB |
| 3,701,105 | 10/1972 | Finnegan et al. | 364/200 |
| 3,766,524 | 10/1973 | Maring et al. | 364/200 |
| 3,806,663 | 4/1974 | Peek et al. | 179/2 EB |
| 3,906,166 | 9/1975 | Cooper et al. | 179/2 EB |
| 3,962,553 | 6/1976 | Linder et al. | 455/89 X |
| 3,972,024 | 7/1976 | Schroeder et al. | 364/200 |
| 3,979,730 | 9/1976 | Bennett et al. | 364/200 |
| 4,003,028 | 1/1977 | Bennett et al. | 364/200 |
| 4,004,283 | 1/1977 | Bennett et al. | 364/200 |
| 4,010,448 | 3/1977 | Bennett et al. | 364/200 |
| 4,025,853 | 5/1977 | Addeo | 455/33 |
| 4,029,900 | 6/1977 | Addeo | 375/114 |
| 4,030,079 | 6/1977 | Bennett et al. | 364/200 |
| 4,032,896 | 6/1977 | Bennett et al. | 364/200 |
| 4,037,204 | 7/1977 | Bennett et al. | 364/200 |
| 4,040,035 | 8/1977 | Bennett et al. | 364/200 |
| 4,069,510 | 1/1978 | Carlow et al. | 364/200 |
| 4,075,688 | 2/1978 | Lynch, Jr. et al. | 364/200 |
| 4,079,455 | 3/1978 | Ozga | 364/200 |
| 4,086,627 | 4/1978 | Bennett et al. | 364/200 |
| 4,087,855 | 5/1978 | Bennett et al. | 364/200 |
| 4,093,982 | 6/1978 | Heuer et al. | 364/200 |
| 4,093,983 | 6/1978 | Masog et al. | 364/200 |
| 4,107,781 | 8/1978 | Barrett et al. | 364/200 |
| 4,118,776 | 10/1978 | Isomura | 364/200 X |
| 4,122,304 | 10/1978 | Mallien | 179/2 EB |
| 4,144,411 | 3/1979 | Frenkiel | 179/2 EB |
| 4,153,993 | 5/1979 | Blume, Jr. et al. | 433/132 |
| 4,220,820 | 9/1980 | Mallien | 179/2 EB |

OTHER PUBLICATIONS

Proceedings of 30th Annual Conference of the IEEE Vehicular Technology Society, International Conference on Transportation Electronics, Sep. 15-17, 1980, Dearborn, MI, Published by: Bohn Printing Co., Utica, MI.

Portable Telephones for Cellular Systems, by Leitich et al., Motorola, Inc., 9/15/80, 80CH1601-Copyright 1980, Vehicular Technology Society IEEE.

(List continued on next page.)

Primary Examiner—Gene Z. Rubinson
Assistant Examiner—W. J. Brady
Attorney, Agent, or Firm—Rolland R. Hackbart; Edward M. Roney; James W. Gillman

[57] ABSTRACT

An improved radiotelephone includes a unique microprocessor and peripheral devices for controlling the operation of portable or mobile radio transceivers in a cellular-type radiotelephone system. The microprocessor is coupled by a data interface unit and synchronization unit to the radio transceiver for transmitting and receiving Manchester-coded supervisory signalling having a 10 KHz bit rate. The microprocessor is also coupled by a unique self-clocking serial data bus and unique interface adapters to the radio transceiver for controlling the operating frequency, audio signals and transmitted RF signal thereof, to a keyboard for sampling the keys thereof, an off-hook switch and display for displaying telephone numbers, and to serial number and telephone number memories for accessing the stored serial and telephone numbers assigned to the radiotelephone. The microprocessor-controlled radiotelephone can be substantially adapted to operate a system selected from a wide variety of conventional and advanced radiotelephone systems by tailoring the microprocessor control program to meet the selected system specifications.

13 Claims, 8 Drawing Figures

OTHER PUBLICATIONS

Portable Telephones for 850 MHz Cellular Systems, by R. E. Fisher et al., Bell Laboratories, Whippany, N.J., 9/15/80, 80CH1601-4, Copyright 1980, Vehicular Technology Society IEEE.

Overview of an A.M.P.S. Mobile Call Processing System, by Robt. M. Fuller et al., U.S. Communications Corp., Kent, Wash., 9/15/80-80CH1601-4, Copyright 1980, Vehicular Tech. Society IEEE.

Mobile Phone, Fit for Pocket May be Near, Wall Street Journal, Sep. 25, 1980.

Motorola, Inc. Instruction Manual—Advanced Mobile Phone System-800 MHz High Capacity Mobile Radiotelephone 68P81039E25-A, published by Motorola Service Publications, Schaumburg, Illinois-1979.

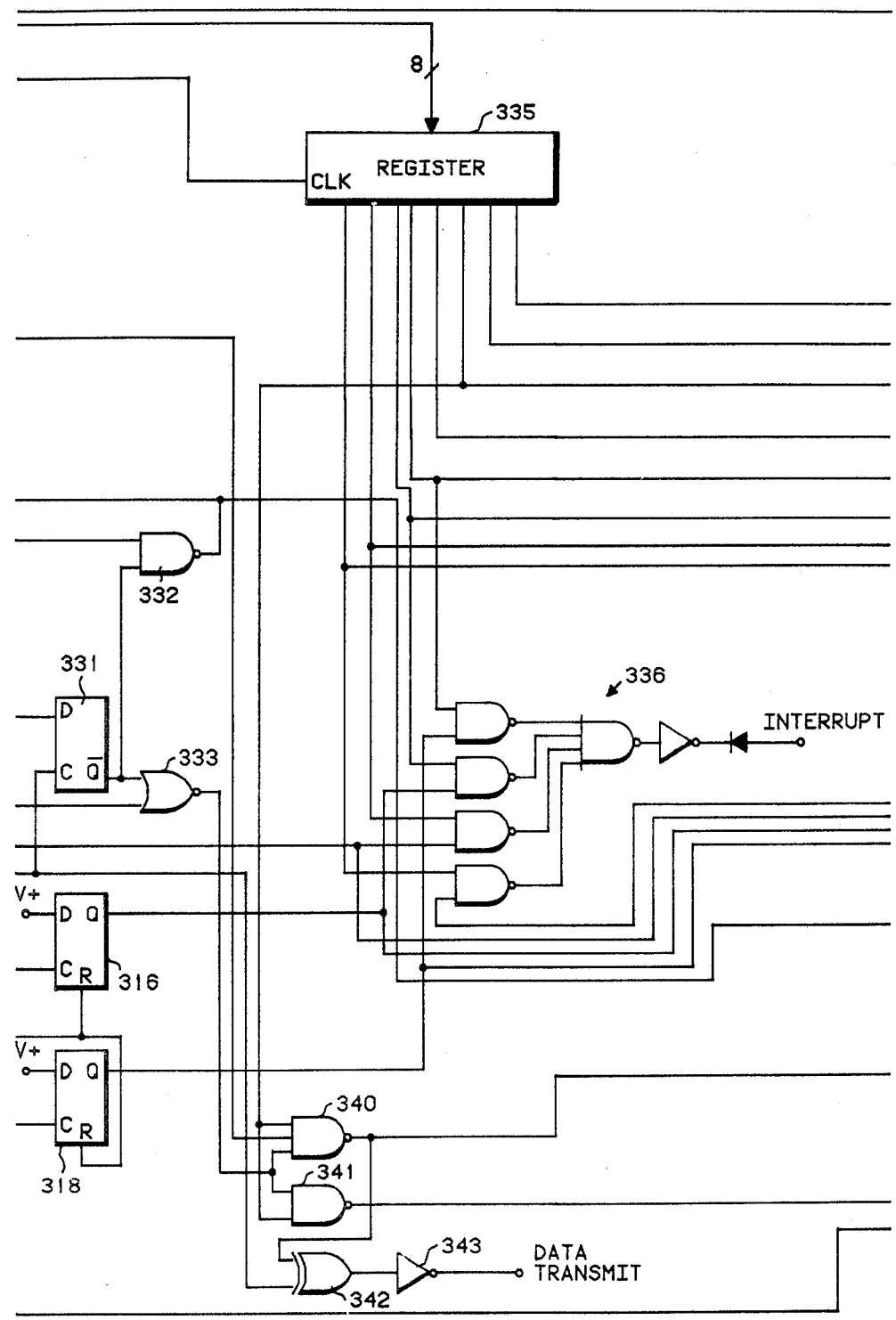

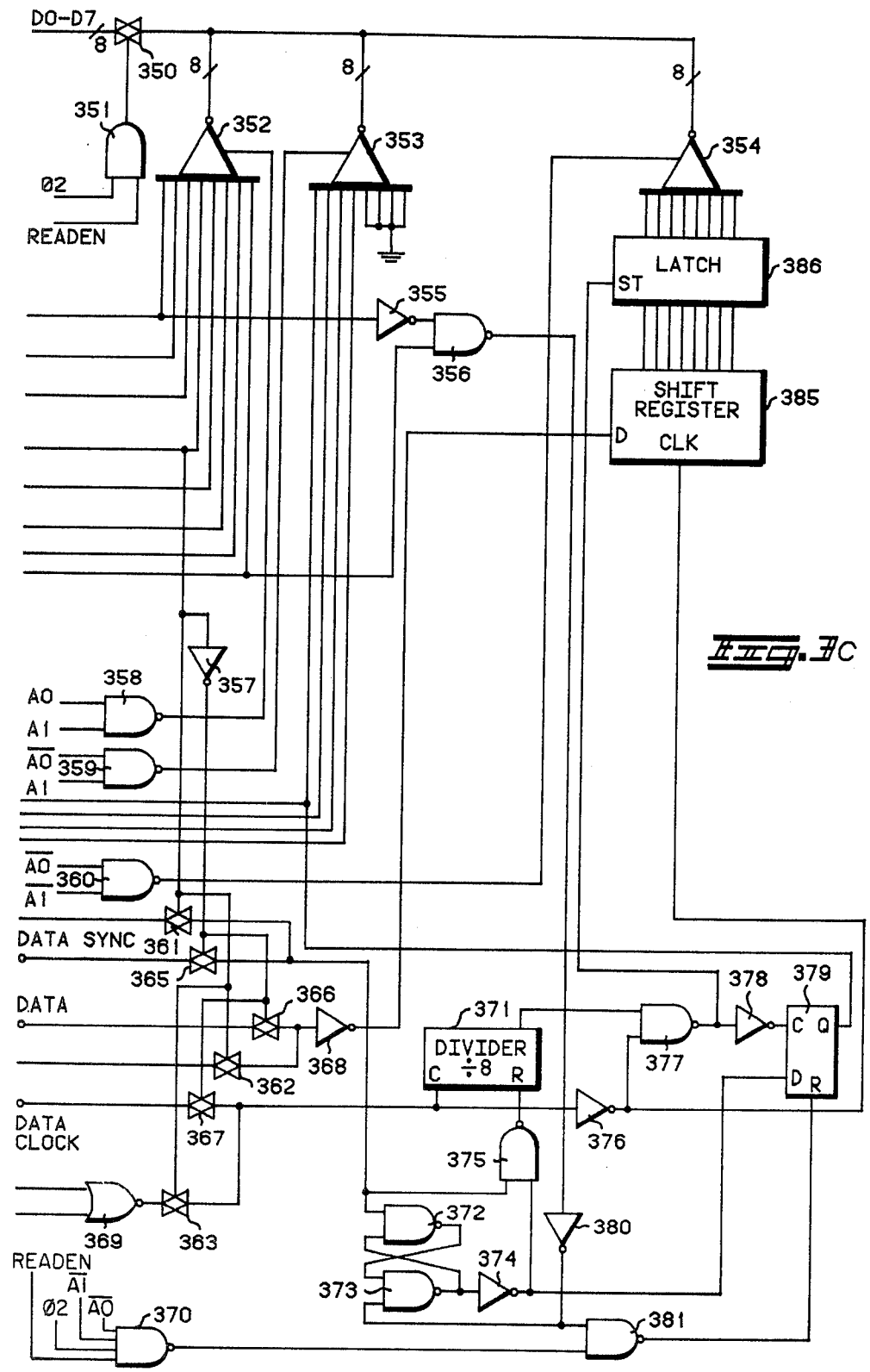

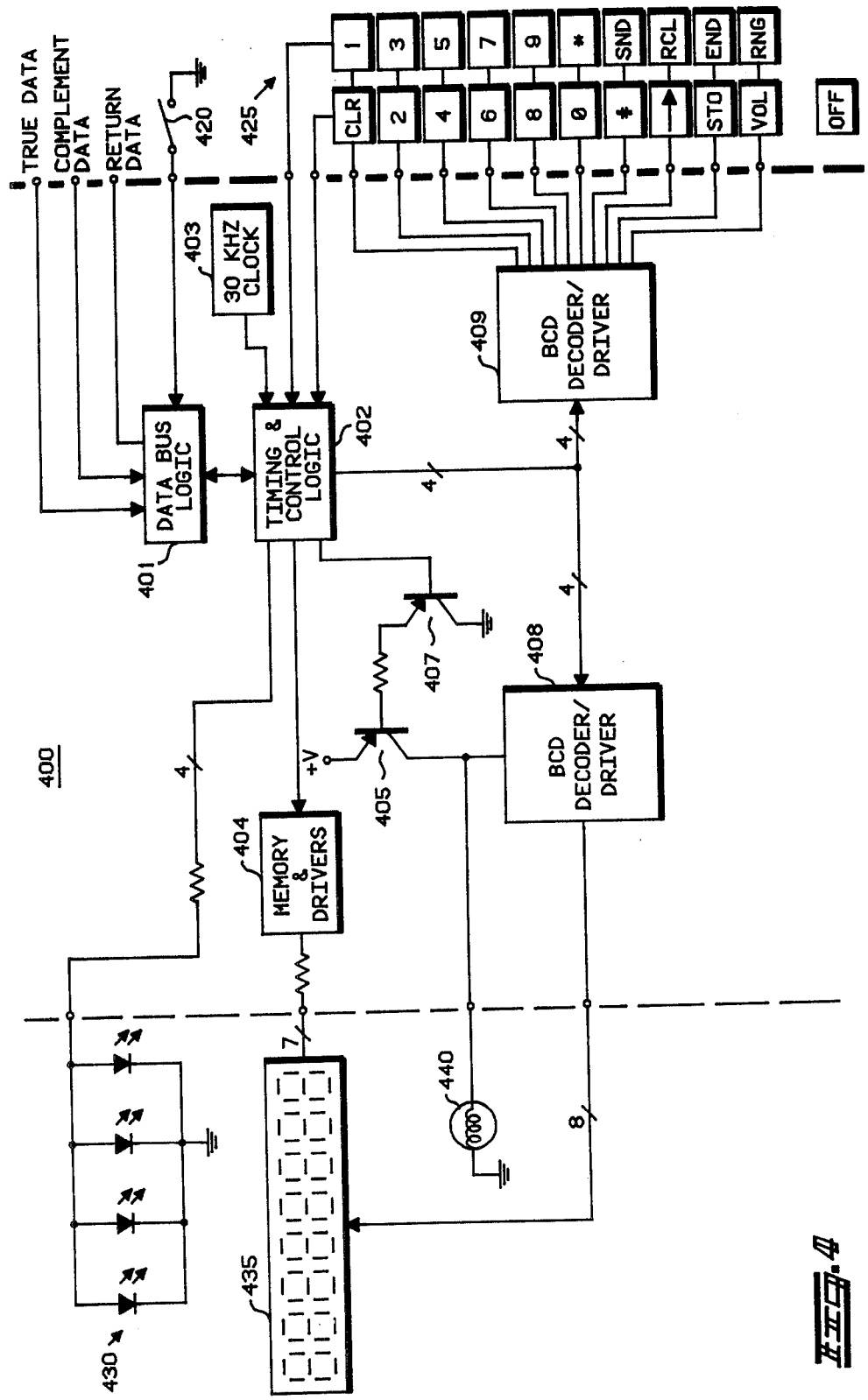

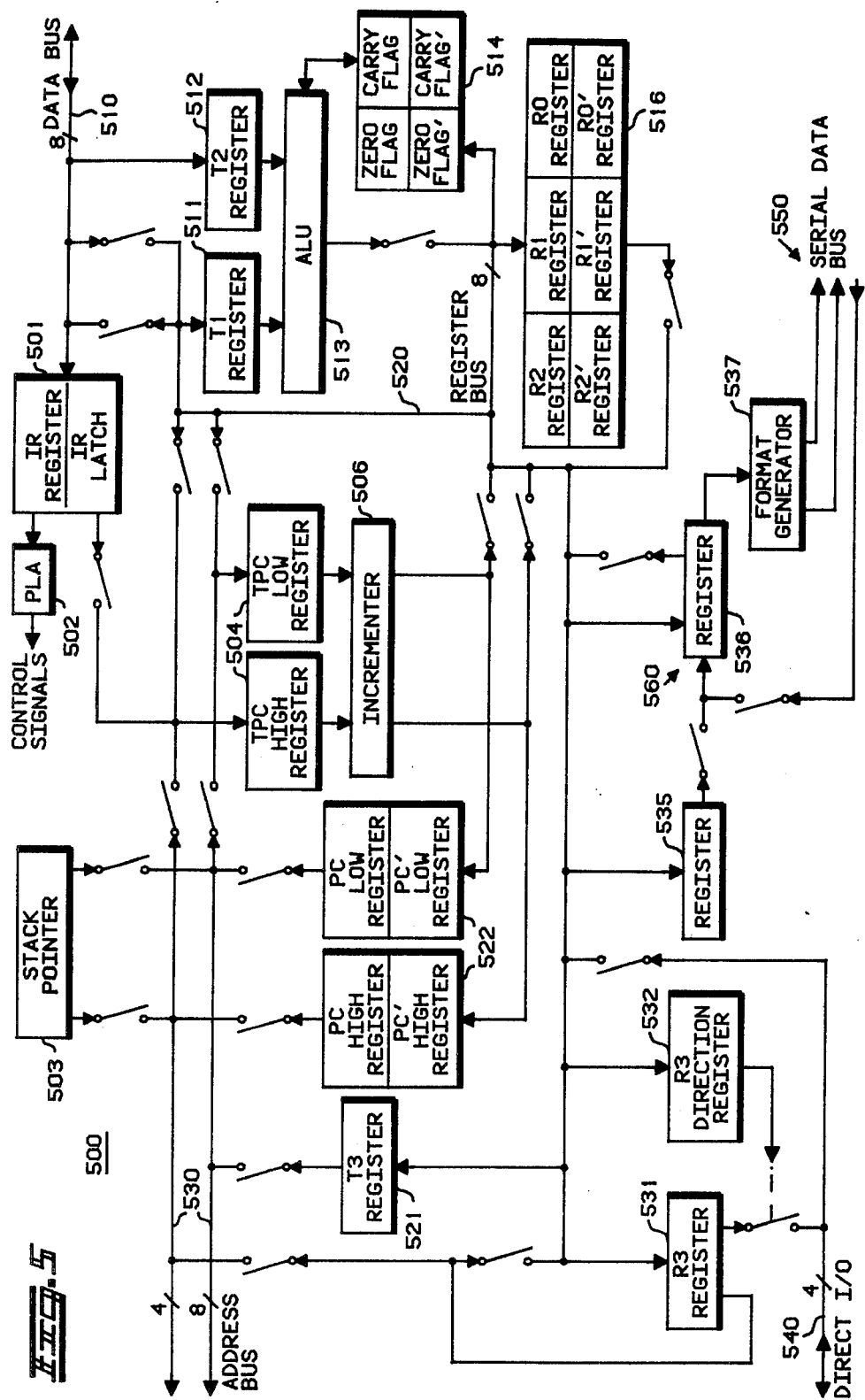

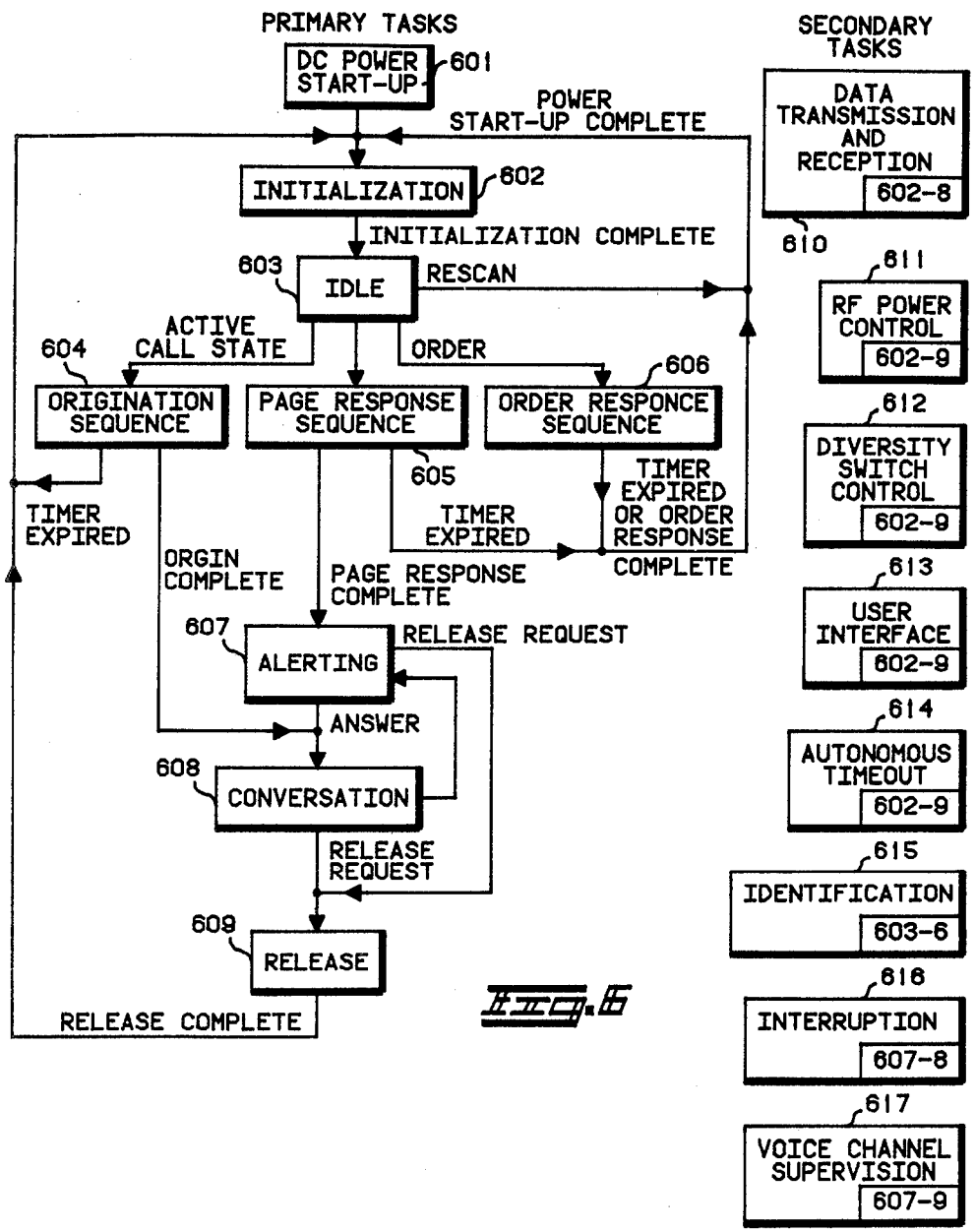

MICROPROCESSOR CONTROLLED RADIOTELEPHONE TRANSCEIVER

RELATED PATENT APPLICATIONS

The instant application is related to the following patent applications filed the same date as and assigned to the same assignee as the instant application: Ser. No. 187,306, now U.S. Pat. No. 4,390,963, by Larry C. Puhl et al., entitled "Interface Adapter Architecture"; Ser. No. 187,302, now U.S. Pat. No. 4,434,461, by Larry C. Puhl, entitled "Communications Microprocessor Architecture"; Ser. No. 187,305, now U.S. Pat. No. 4,398,265, by Larry C. Puhl et al., entitled "Keyboard and Display Interface Adapter Architecture"; and Ser. No. 187,303, now U.S. Pat. No. 4,369,516, by John P. Byrns, entitled "Self-Clocking Data Transmission System and Method Therefor". The instant application is also related to U.S. patent applications, Ser. No. 119,605, now U.S. Pat. No. 4,312,074 by Kenneth A. Felix and James A. Pautler, entitled "Improved Method and Apparatus for Detecting a Data Signal Including Repeated Data Words", and Ser. No. 119,350, now U.S. Pat. No. 4,302,845, by John P. Byrns and Michael J. McClaughry, entitled "Phase-Encoded Data Signal Demodulator", both of which were filed on Feb. 7, 1980, and are assigned to the instant assignee. By reference thereto, the foregoing related patent applications are incorporated in their entirety into the instant application.

BACKGROUND OF THE INVENTION

The present invention relates generally to radio transceivers, and more particularly to microprocessor-controlled radio transceivers for use in radiotelephone systems.

As radiotelephone systems increase in size and complexity to accommodate greater numbers of mobile and portable radiotelephones operating in geographic areas including several large cities or even several states, it is necessary that the control circuitry of these radiotelephones become increasingly sophisticated. For example, in cellular radiotelephone systems, mobile and portable radiotelephones must be capable of transmitting and receiving high-speed, supervisory signals on dedicated signalling radio channels and also on voice radio channels during conversations. Prior radiotelephone control circuitry, such as that described in U.S. Pat. Nos. 3,458,664 and 3,571,519, does not have the capacity for processing these high-speed, supervisory signals required to be received and transmitted during normal operation in such cellular radiotelephone systems. Conventional microprocessors have been integrated into some prior radiotelephones, such as the radiotelephones in U.S. Pat. No. 4,122,304, for providing additional telephone type features, such as automatic telephone number dialing, to radiotelephone subscribers in the present day improved mobile telephone system (IMTS) provided and operated by many telephone companies. However, conventional microprocessor-controlled radiotelephones lack the capacity to accommodate the high speed, supervisory signalling encountered in cellular radiotelephone systems, while at the same time monitoring and controlling other portions of the radiotelephone, such as the transmitting and receiving circuitry, a keyboard, and a telephone number display.

SUMMARY OF THE INVENTION

Accordingly, it is an object of the present invention to provide an improved microprocessor-controlled radiotelephone that accommodates the high-speed supervisory signalling encountered in advanced radiotelephone systems.

It is another object of the present invention to provide an improved microprocessor-controlled radiotelephone that accommodates radio transceiver control signals on a low priority basis and high-speed radiotelephone system supervisory signalling on a high priority basis.

It is yet another object of the present invention to provide improved radiotelephone control circuitry suitable for use by either portable or mobile radiotelephones in advanced radiotelephone systems.

According to the present invention, an improved radiotelephone includes a keyboard, a display, a radio transceiver, interface circuitry coupled to keyboard and display, interface circuitry coupled to the radio transceiver, a serial data bus coupled to the interface circuitry and a microprocessor coupled to the serial data bus. The serial data bus includes two forward data signal lines for carrying self-clocking data signals from the microprocessor to the interface circuitry and a return data signal line for carrying return data signals from the interface circuitry. The keyboard and display interface circuitry receives data signals from the forward data signal lines and applies the received data signals to the elements of the display. The keyboard and display interface circuitry also samples the keys of the keyboard and applies a return data signal representative of the sampled keys to the return data signal line. The radio interface circuitry receives data signals including frequency and audio control signals from the forward data signal lines, applies the received frequency control signals to a frequency synthesizer for controlling the radio transceiver operating frequencies and applies the received audio control signals to the radio transceiver for controlling the transmitted and received audio signals. The microprocessor controls the radio transceiver operating frequencies and transmitted and received audio signals and the signals displayed in the display elements by applying appropriate data signals to the forward data signal lines. The microprocessor is responsive to data signals received on the return data signal line from the keyboard and display interface circuitry for controlling the operation of the radio transceiver in accordance with the states of the sampled keys from the keyboard.

BRIEF DESCRIPTION OF THE DRAWINGS

FIG. 4 is a functional block diagram of the keyboard and display interface adapter in FIG. 1.

FIG. 5 is a functional block diagram of the microprocessor in FIG. 1.

FIG. 6 is a flow diagram of the microprocessor control program stored in the ROM in FIG. 1.

DETAILED DESCRIPTION OF THE PREFERRED EMBODIMENT

Figure 1:
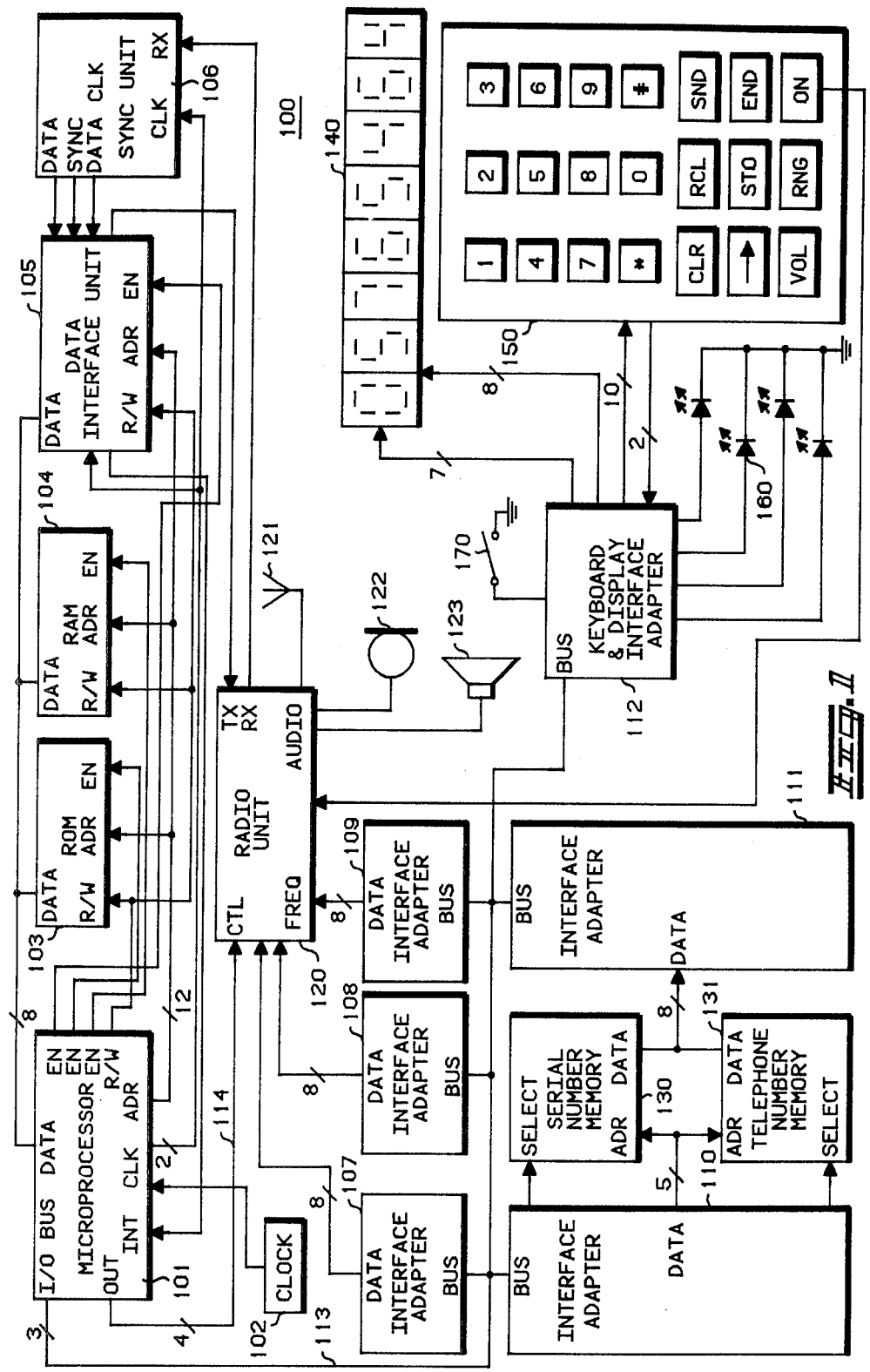
FIG. 1 is a block diagram of a radiotelephone embodying the present invention.

Referring to FIG. 1, there is illustrated a block diagram of radiotelephone 100 embodying the present invention. Radiotelephone 100 is suitable for use in cellular radiotelephone systems of the type described in U.S. Pat. No. 3,906,166 and in a developmental cellular system application, filed by Motorola and American Radio-Telephone Service, Inc. under Docket No. 18262 with the Federal Communications Commission in February, 1977. The radiotelephone 100 provides the same type of fully automatic telephone service to a mobile or portable operator that is provided to land line subscribers. Radiotelephone service is provided over a wide geographical area by dividing the area into a number of cells. Each cell typically has a base station which provides a supervisory signalling radio channel and a number of voice radio channels. Calls are placed to, and originated by, radiotelephones over the supervisory signalling channel in each of the cells. Upon completion of the supervisory signalling, the radiotelephone is assigned a voice channel and switches from the signalling channel to the voice channel for the duration of the call. In the event that a radiotelephone leaves a cell and enters another cell, the radiotelephone is automatically switched over, or handed off, to an available voice channel in the new cell. The supervisory signals carried on the signalling channel, and on voice channels for handing off a radiotelephone as it changes cells, are provided by digital signals encoded in a suitable format, such as Manchester coding, and transmitted at a relatively high speed, such as 10 kHz. The format and transmission of the digital signals are described in more detail in the aforementioned co-pending applications Ser. Nos. 119,605 now U.S. Pat. No. 4,312,074 and 119,350 now U.S. Pat. No. 4,302,845.

In order to accommodate the high speed supervisory signalling in such cellular radiotelephone systems, the radiotelephone 100 includes a microprocessor 101 together with peripheral devices 103–112, a synthesized radio unit 120, serial number and telephone number memories 130 and 131, a telephone number display 140, a keyboard 150 and status indicating LED's 160. Microprocessor 101 (described in further detail in co-pending application Ser. No. 187,302, now U.S. Pat. No. 4,434,461) is responsive to a control program (see Table VIII) stored in read-only memory (ROM) 103 for receiving data signals from the radio unit 120 by way of synchronization unit 106 (described in further detail in co-pending application Ser. No. 119,350 now U.S. Pat. No. 4,302,845) and data interface unit 105 for storage in random access memory (RAM) 104, and transmitting to radio unit 120 supervisory data signals stored in RAM 104 by way of data interface unit 105.

Microprocessor 101 is also coupled to radio unit 120 directly by four control signals 114, one for powering up the radio unit, two for controlling the frequency synthesizer and one for sensing audio signals applied to microphone 122, and also by way of a unique self-clocking serial data bus 113 and interface adapters 107–109 (described in further detail in co-pending patent application Ser. No. 187,306, now U.S. Pat. No. 4,390,963). Microprocessor 101 is coupled to interface adapters 107–109 by self-clocking serial data bus 113, which includes two forward data signal lines and a reverse data signal line (described in further detail in co-pending application Ser. No. 187,303, now U.S. Pat. No. 4,369,516). Data signals applied to the forward data signal lines are received by interface adapters 107–109 and applied to radio unit 120. Interface adapter 107 provides audio control signals to the receiver of radio unit 120 for selecting one of two received audio signals if the radio unit includes two antennas 121 for space diversity purposes, controlling the volume of the received audio signal applied to speaker 123, and muting the received audio signal to provide a conventional squelch type function. Interface adapter 108 provides audio control signals to the transmitter of radio unit 120 for controlling the RF power of the transmitted signal, muting of the transmitted audio signal and powering up the transmitting circuitry. Interface adapter 109 applies an eight-bit frequency control signal to a frequency synthesizer (not shown) in radio unit 120 for determining the transmitting and receiving frequencies thereof. The frequency control signal applied to the frequency synthesizer in radio unit 120 can be expanded to up to sixteen bits by utilizing two direct control signals 114 from the microprocessor 101 to selectively apply either eight high order bits or eight low order bits to the frequency synthesizer. In addition, the control signal 114 sensing audio signals applied to microphone 122 can be utilized by microprocessor 101 for controlling the signal from interface adapter 108 for powering of the radio transmitting circuitry, so that the radio transmitter is powered only when audio signals are sensed. Radio unit 120 can be any conventional radio unit suitable for cellular system operation, such as the radio described in Motorola Instruction Manual 68P81039E25, published by Motorola Service Publications, Schaumburg, Ill., 1979. The radiotelephone described in the aforementioned instruction manual is a frequency synthesized radio specially adapted for use in cellular radiotelephone systems.

Microprocessor 101 is also coupled by way of the serial data bus 113 to interface adapters 110 and 111 for accessing a serial number and telephone number assigned to the radiotelephone 100. The serial number and telephone number of the radiotelephone 100 are stored in separate memories 130 and 131, respectively, so that each may be changed simply by replacing one memory with another. The serial number and telephone number may include a plurality of digits stored in successive locations of these memories. In order to access each digit of the serial number or telephone number, the microprocessor 101 transmits an address data signal by way of the serial data bus 113 to interface adapter 110. The address signal received by interface adapter 110 is applied to the serial number memory 130 and telephone number memory 131. The applied address signal includes one bit for selecting between the serial number memory 130 and telephone number memory 131 and five bits for selecting the particular digit of the serial number or telephone number to be read out. The digit of the serial number or telephone number read out from the addressed serial number memory 130 or telephone number memory 131 is applied to interface adapter 111 which couples the read-out digit to the serial data bus 113 for transmission back to the microprocessor 101.

Microprocessor 101 is also coupled by way of the serial data bus 113 to a unique keyboard and display interface adapter 112 (described in further detail in co-pending application Ser. No. 187,305, now U.S. Pat. No. 4,398,265). The keyboard and display interface adapter 112 provides for the display of eight digits of an entered telephone number in display 140, scans the keyboard 150 for activated keys and activates status indicating LED's 160, one indicating that the radiotelephone is in use, another that no service is available to the radiotelephone and the last that the radiotelephone is locked preventing unauthorized use. The keyboard and display interface adapter 112 scans the keys of the keyboard 150, monitors off-hook switch 170, and applies a data signal to the serial data bus 113 indicating which keys are found to be activated and whether the off-hook switch 170 is activated or not. The keyboard and display interface adapter 112 also receives data signals transmitted by the microprocessor 101 on the serial data bus 113 for display in the telephone number display 140 or for activating one of the four status LED's 160.

The radio unit 120 of the radiotelephone 100 may be either a mobile unit as described in the aforementioned Motorola Instruction Manual 68P81039E25 or a handheld portable unit of the type described in U.S. Pat. Nos. 3,906,166 and 3,962,553, having an external appearance as illustrated in U.S. Pat. No. Des. 234,605. The microprocessor 101 and associated peripheral devices 103–112 are of the type that may readily be integrated into a semiconductive substrate, such as CMOS, and provided individually or together on an integrated circuit. The microprocessor 101 and related peripheral devices 103–112 have been architectured such that the high priority supervisory signals received and transmitted by radio unit 120 are handled on a high speed interrupt basis by data interface unit 105 and synchronization unit 106, while the lower priority control signals for the radio unit 120, display unit 140, keyboard 150 and status LED's 160 are handled on a lower speed basis by way of the serial data bus 113 and interface adapters 107–112. Since the serial data bus 113 is self-clocking and independent of the speed of transmission, interface adapters 107–112 can be physically located remote from microprocessor 101 without any degradation in performance. Thus, interface adapters 107–109 may be located in the radio unit, if desired, and the keyboard and display interface adapter 112 may be located on the same printed circuit board as the telephone number display 140 and keyboard 150, both being physically separated from the printed circuit board on which microprocessor 101 is located. Further details as to the exact description and construction of the transmitting and receiving circuitry in a typical radio unit 120 can be found in the aforementioned Motorola Instruction Manual 68P81039E25.

Figure 2:
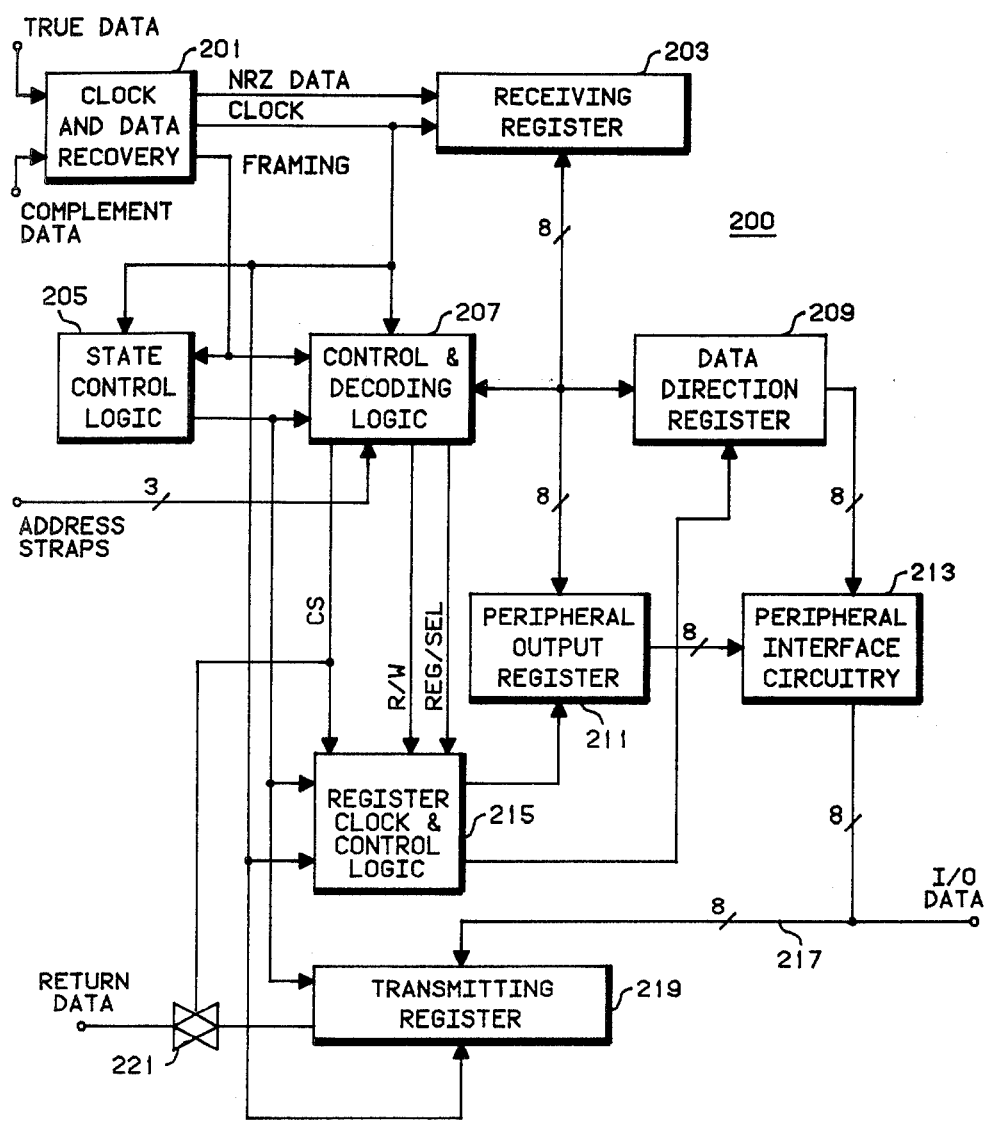
FIG. 2 is a functional block diagram of the interface adapters in FIG. 1.

Referring to FIG. 2 there is illustrated a unique interface adapter 200 (described in further detail in co-pending application Ser. No. 187,306, now U.S. Pat. No. 4,390,963 that may be advantageously utilized in a radiotelephone embodying the present invention. The interface adapter 200 is coupled to eight interface signals 217 which may be selected to be either input or output signals under program control. Sixteen-bit data signals including address, control and data portions, are transmitted on the serial data bus 113 by microprocessor 101 in FIG. 1 to one or more interface adapters 200 in a self-clocking format on two forward data signal lines, which are designated the true data and complement data signal lines. The data transmission format, described in further detail in co-pending application Ser. No. 187,303, now U.S. Pat. No. 4,369,516, makes use of the four possible two-bit binary states of the true data and complement data signal lines in order to encode the binary state of each bit, a clock signal and framing information. The two-bit binary states assigned to the true data and complement data signal lines for each of the four possible states are illustrated hereinbelow in Table I. It is to be understood that these binary states can be reassigned in many different ways in accordance with the teachings of co-pending application Ser. No. 187,303, now U.S. Pat. No. 4,369,516.

TABLE I

| TRUE DATA | COMPLEMENT DATA | TWO-BIT STATE |
|---|---|---|
| 0 | 0 | Word State |
| 0 | 1 | Zero State |
| 1 | 0 | One State |
| 1 | 1 | Bit State |

Referring to Table I, the word state is provided before and after the sixteen-bit data signal, the zero state is provided for each binary zero bit of the data signal, the one state is provided for each binary one bit of the data signal and the bit state is provided between successive signal and signal bits. Successive data signals may be transmitted one after another as long as the word state of the true data and complement data signal lines is provided between them. A typical data signal coded according to this format is illustrated by the waveforms in FIG. 4.

The true data and complement data signal lines are coupled to clock and data recovery circuitry 201 which recovers a non-return-to-zero (NRZ) data signal, a clock signal and a framing signal. The NRZ data signal is loaded into an eight-bit receiving register 203 in response to the clock signal. The sixteen-bit data signal is divided into an address and control portion, including bits 1–8, and a data portion, including bits 9–16, as illustrated in Table II hereinbelow. Thus, the first eight bits shifted into receiving register 203 are the address and control portion of the data signal.

TABLE II

| DATA BIT | FUNCTION | DESCRIPTION |
|---|---|---|
| 1 | Register Select | 1 selects OR |
|   |   | 0 selects DDR |
| 2–6 | Address | Bits 2-4 = Unit Address |
|   |   | Bit 5 = 1 |
|   |   | Bit 6 = 0 |
| 7 | Bus Sense | 1 for true |
|   |   | 0 for complement |
| 8 | Read/Write | 1 for Read |
|   |   | 0 for Write |
| 9–16 | Data | DDR; 1 for outputs, |
|   |   | 0 for inputs |
|   |   | OR; output data |

In response to the recovered clock signal from the clock and data recovery circuitry 201, the state control logic 205 provides fifteen control states for identifying the bits of the received data signal. The control and decoding logic 207 decodes the address portion of the data signal loaded into receiving register 203 and provides a chip select signal to register clock and control logic 215. The control and decoding logic 207 also is responsive to selected control states from the state control logic 205 for providing a read/write control signal, a register select control signal and a bus sense control signal to the register clock and control logic 215. The register clock and control logic 215 enables either the peripheral output register 211 or the data direction register 209 in response to the register select signal and framing signal for loading the eight-bit data portion of the data signal into the selected register. The data direction register 209 selects those interface signals 217 which are to be output signals and enables the peripheral interface circuitry 213 to apply the binary state stored in the peripheral output register 211 to the interface signals 217. Binary one bits of the data direction register cause corresponding interface signals 217 to be output signals, while binary zero bits cause corresponding interface signals 217 to be input signals. If the interface adapter 200 has received its address, the chip select signal from control and decoding logic 207 enables transmission gate 221 for applying sampled interface signals stored in transmitting register 219 to the return data signal line. The sampled interface signals are shifted out of the transmitting register 219 in response to the recovered clock signal from clock and data recovery circuitry 201.

Although five bits are designated as the address portion of the data signal, two of the bits are fixed and the other three bits are variable, being compared to three address straps by the control and decoding logic 207 to determine if the interface adapter 200 has been selected. Using only three of the address bits allows for uniquely addressing eight different interface adapters. By interchanging the connections of the true data and complement data signal lines to the clock and data recovery circuitry 201, an additional eight interface adapters can be uniquely addressed. The bus sense control signal from the control and decoding logic 207 indicates whether or not the true data and complement data signal lines have been interchanged, and, if interchanged, causes the data portion of the data signal to be complemented as it is shifted into receiving register 203. For addressing each of these additional eight interface adapters, the two fixed address bits, bits 5 and 6 are complemented so that the chip select signal is properly decoded by the control and decoding logic 207.

Figure 3A:
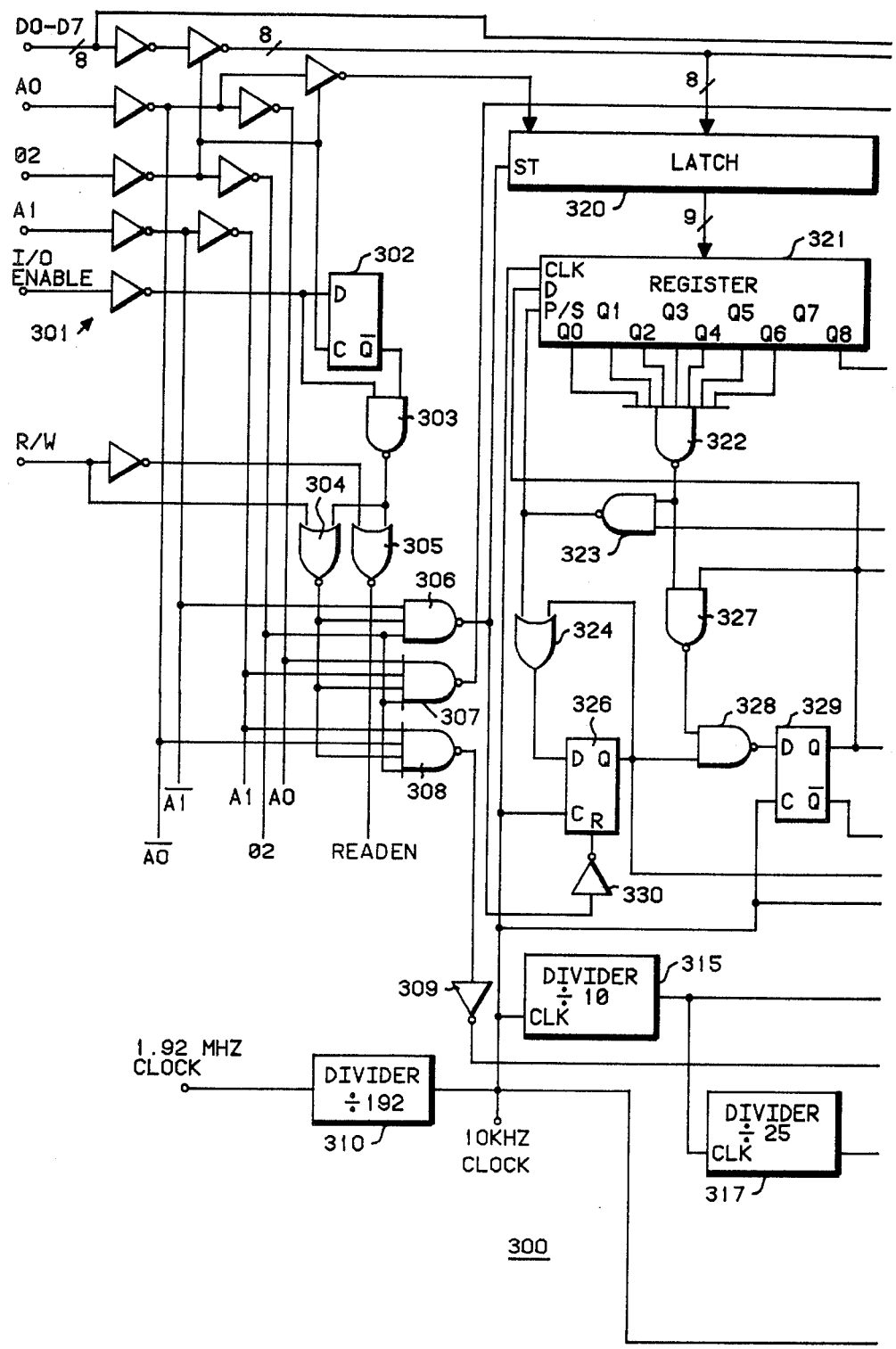
FIG. 3, including FIGS. 3A, 3B and 3C arranged together, is a detailed circuit diagram of the data interface unit in FIG. 1.

Referring to FIGS. 3A, 3B and 3C taken together, there is illustrated a detailed circuit diagram of the data interface unit 105 in FIG. 1. The data interface unit is serviced by the microprocessor on an interrupt basis for transmitting and receiving supervisory signals. The supervisory signals are coded according to Manchester coding and transmitted by data interface unit 105 to radio unit 120 in FIG. 1 at a 10 KHz bit rate. The format and transmission of the supervisory signals are described in more detail in the aforementioned co-pending application Ser. Nos. 119,605 now U.S. Pat. No. 4,312,074 and 119,350 now U.S. Pat. No. 4,302,845. Manchester coded supervisory signals are received by synchronization unit 106 in FIG. 1 and upon verification and decoding, the synchronization unit 106 indicates that valid supervisory signals have been received by providing a synchronization signal to data interface unit 105. The synchronization signal provided by synchronization unit 106 is utilized by data interface unit 105 for interrupting microprocessor 101. Supervisory signals transmitted by the data interface unit 105 to the radio unit 120 are referred to as reverse data signals, while supervisory signals received by the synchronization unit 106 from radio unit 120 are referred to as forward data signals. The data interface unit provides an interrupt signal to microprocessor for the four following conditions: The reverse data register 321 is full; the forward data register 385 is empty; the one millisecond timer 316 is set; and the 25 millisecond timer 318 is set. The microprocessor can enable or disable any of these interrupt conditions by loading an appropriate bit into control register 335, four bits of which enable corresponding signals to be applied to the microprocessor interrupt signal via gating circuitry 336.

The data interface unit is selected by microprocessor by providing the I/O enable signal, which is coupled via flip-flop 302 and gate 303 to enable decoding logic gates 304–308. Decoding logic gates 306–308 are responsive to address bits A0 and A1 and the R/W signal for providing corresponding control signals (see Table III hereinbelow). Gate 305 provides a read/enable signal to gate 351, while gate 304 provides a write/enable signal to gates 306–308. The control signal from gate 306 is utilized to write a reverse data signal from data bus lines D0–D7 into latch 320. The data loaded into latch 320 is then parallel loaded into reverse data register 321 to be Manchester coded and transmitted via gates 340, 342 and 343 to radio unit 120 in FIG. 1. The output from gate 306 also resets flip-flop 326 by way of gate 330. The output of flip-flop 326, the reverse interrupt signal is coupled to gating circuitry 336 for application to the microprocessor interrupt signal and to flip-flop 329 via NAND gate 328, causing the output of flip-flop 329 to have a binary one state. The output of flip-flop 329 is applied to the D input of reverse data register 321 and to the D input of flip-flop 331. The outputs of flip-flops 329 and 331 are combined by gate 332 to provide a shift enable signal which is coupled via gate 323 to the P/S input of the reverse data register 321 causing it to serially shift out the bits of the reverse data signal. Once the reverse data signal has been shifted out of reverse data register 321 and applied via gates 340, 342 and 343 to radio unit 120 in FIG. 1, the output of gate 323 changes state causing the reverse data register 321 to be returned to the parallel load mode again.

TABLE III

| I/O ENABLE | A1 | A0 | R/W | FUNCTION |
|---|---|---|---|---|
| 1 | 0 | 1 | 0 | Reset reverse data interrupt and write 8 bits into reverse data register |
| 1 | 0 | 0 | 1 | Reset forward data interrupt and read forward data |
| 1 | 0 | 0 | 0 | Reset reverse data interrupt and write 1 to 7 bits into reverse data register |
| 1 | 1 | 0 | 0 | Reset 1 ms timer and reset 25 ms timer |
| 1 | 1 | 0 | 1 | Read status register |
| 1 | 1 | 1 | 0 | Write control register |
| 1 | 1 | 1 | 1 | Read control register |

The output of gate 308 is utilized to reset the 1 ms timer 316 and the 25 ms timer 318. Divider 315 is responsive to the 10 KHz clock signal for providing a pulse at 1 ms intervals, causing the output of flip-flop 316 to have a binary one state. Divider 317 is responsive to the output of divider 315 for providing a pulse at 25 ms intervals, causing the output of flip-flop 318 to have a binary one state. The 1 ms timer signal and 25 ms timer signal from these flip-flops 316 and 318 are utilized by the microprocessor control program (see Table VIII) for timing and scheduling the primary and secondary tasks to be performed on a cyclical basis, as shown in FIG. 6. Both the 1 ms timer signal and the 25 ms timer signal are gated with corresponding bits of control register 335 and applied to the microprocessor interrupt signal by gating circuitry 336. Once the microprocessor has responded to the interrupt signal caused by either the 1 ms timer signal or the 25 ms timer signal, the microprocessor may then access the data interface unit and enable gate 308 to reset flip-flops 316 and 318, preparing for the next 1 ms and 25 ms time interval.

Gate 307 is coupled to control register 335 and clocks a data signal from data bus lines D0-D7 into control register 335. The first four bits of the data signal loaded into control register 335 enable corresponding signals applied by gating circuitry 336 to the microprocessor interrupt signal. Of the other four bits loaded into control register 335, one bit is utilized to enable gates 340 and 341 for transmitting Manchester coded data signals to the radio unit 120 in FIG. 1, another bit is utilized to reset the forward data interrupt signal 379 via gates 355, 356, 380 and 381, another bit is used to identify the presence of data signals or voice signals, and the last bit is utilized to select internally generated data in place of data from synchronization unit 106 in FIG. 1. The bits loaded into control register 335 can be read by the microprocessor by enabling gates 358 and 351 for applying the bits of control register 335 to the data bus lines D0-D7 350 via gate 352 and transmission gate 350. The microprocessor may also read the binary state of the various interrupt signals by enabling gates 359 and 351 for applying the interrupt signals to the data bus lines D0-D7 via gate 353 and transmission gate 350.

The data interface unit can select between data signals recovered by the synchronization unit 106 in FIG. 1 and internally generated data signals from gate 341 by means of one of the bits in control register 335. If the internally generated data signals from gate 341 are selected, transmission gates 361-363 are enabled, and, if the data signals from synchronization unit 106 in FIG. 1 are selected, transmission gates 365-367 are enabled via gate 357. The selected data signal is applied via gate 368 to shift register 385. The selected clock signal is coupled by gate 376 to gate 377 and the clock input of the forward data register 385. The data synchronization signal from transmission gates 361 and 365 is utilized to reset divider 371 and to set latch 372, 373, providing a binary one state at the output of gate 374. Divider 371 is clocked by the selected clock signal and enables flip-flops 379 by way of gates 377 and 378 to provide a forward interrupt signal when eight bits of the data signal have been shifted into forward data register 385. The output of gate 377 causes the eight bits shifted into forward data register 385 to be loaded into latch 386. The forward data interrupt signal from flip-flop 379 is reset via gate 381 by enabling gate 370, and also by the last bit of control register 335 via gates 355, 356 and 380.

The data interface chip gives the microprocessor a great degree of flexibility in accommodating various formats of supervisory signalling, since the transmission format is under control of the microprocessor. The data interface unit also gives the microprocessor complete control over the selection and priority of interrupts. Thus, the microprocessor can dynamically prioritize the various interrupt signals depending on the degree of system usage and loading.

Referring to FIG. 4, there is illustrated a unique display and keyboard interface adapter 400 (described in further detail in co-pending application Ser. No. 187,305, now U.S. Pat. No. 4,398,265) that may be advantageously utilized in a radiotelephone embodying the present invention. The keyboard and display interface adapter 400 can store and refresh up to sixteen digits for display in a suitable display 435, such as an LED type or liquid crystal type display. If ten or less digits of the display are utilized, one can programmably shorten the display refresh cycle, thereby increasing the intensity of the displayed digits. The keyboard and display interface adapter 400 can also scan and debounce up to thirty-two keys of a pushbutton keyboard 425. When an activated key is detected, one can programmably enable an audio tone generator (not shown) to provide audible feedback. If the display refresh cycle is shortened for a ten digit display 435, the keyboard and interface adapter 400 will then scan and debounce twenty keys of a pushbutton keyboard 425.

The keyboard and display interface adapter 400 is coupled to microprocessor 101 in FIG. 1 by way of self-clocking serial data bus 113. Sixteen-bit data signals including address, control and data portions, are transmitted on the serial data bus 113 by microprocessor 101 in FIG. 1 to the keyboard and display interface adapter 400 in a self-clocking format on two forward data signal lines (see Table I hereinabove).

The sixteen-bit data signals are received on the serial data bus by data bus logic 401 and timing and control logic 402. As illustrated in Table IV hereinbelow, each sixteen-bit data signal includes address and control bits 1-8 and data bits 9-16 (where bit one is received first). In order to properly select the keyboard and display interface adapter, bits 1-6 of a data signal are XXX000 or 000100 depending on whether the status of the display 435 or LED's 430 is to be updated. The data portion, bits 9-16, of received data signals are used to control LED's 430, transistors 405 and 407 for powering BCD decoder/driver 408 and lamp 440, and to update the digits stored in memory 404 for application to display 435.

TABLE IV

SIXTEEN-BIT DATA SIGNAL

| DATA BIT | FUNCTION | DESCRIPTION |
| --- | --- | --- |
| 1-3 | Address | RAM address or all zero |
| 4 | Register Select | 1 selects CR 0 selects DR |
| 5-6 | Chip Select | Both zero |
| 7 | Bus Sense | 1 for true 0 for complement |
| 8 | Read/Write | 1 for read 0 for write |
| 9-12 | Data | DR; Low BCD display digit CR; Ten digit mode, Display enable, Reset status bits, Audio enable |
| 13-16 | Data | DR; High BCD display digit CR; LED's ON/OFF |

The timing and control logic 402 enables BCD decoder/driver 408 and memory and drivers 404 so that display 435 is continuously strobed with the digits stored in memory 404. At the same time, the timing and control logic enables BCD decoder/driver 409 to sequentially strobe each row of keys in keyboard 425. The +V power supply to BCD decoder/driver 408 and lamp 440 can be programmably disabled by turning off transistors 407 and 405. If a particular key of keyboard 425 is activated, a signal is returned by way of the column conductors to timing and control logic 402. Since the keyboard and display interface adapter 400 is coupled to the microprocessor 101 in FIG. 1 only by way of a serial data bus, the keyboard and display interface adapter 400 may by located with the display 435 and keyboard 425 at a considerable distance from microprocessor 101.

Referring to FIG. 5, there is illustrated a general block diagram of a microprocessor 101 in FIG. 1 (described in further detail in co-pending application Ser. No. 187,302, now U.S. Pat. No. 4,434,461). Microprocessor 500 is an eight-bit microprocessor that may be constructed on an integrated circuit utilizing conventional silicon gate CMOS technology to provide relatively low power consumption. Microprocessor 500 is architectured such that the bit manipulations required by high speed supervisory signalling, such as that required in cellular type radiotelephone systems, can be quickly and efficiently accommodated. Thus, microprocessor 500 can be advantageously utilized in any application where both low power consumption and fast bit manipulations are required.

The architecture of microprocessor 500 is organized around three buses, data bus 510, register bus 520, and address bus 530. Data signals are routed between the various blocks of microprocessor 500 by selectively interconnecting the three buses 510, 520 and 530 in response to control signals provided by ALU and control programmable logic arrays (PLA) 502. PLA's 502 decode program instructions loaded in instruction register (IR) 501 to provide the appropriate control signals for executing each instruction in Table V hereinbelow. The various control signals provided by PLA's 502 are described in further detail in the aforementioned co-pending application Ser. No. 187,302 now U.S. Pat. No. 4,434,461.

Microprocessor 500 also includes three general purpose registers 516, R0, R1 and R2, an arithmetic logic unit (ALU) 513 with two temporary registers 511 and 512, T1 and T2, and zero and carry flags 514, serial bus circuitry 560 including format generator 537 and registers 535 and 536, a special purpose register 532, R3, a stack pointer counter 503, a twelve-bit program counter register 522, a temporary program counter register 504 and associated incrementer 506, and a temporary address register 521, T3. All of the registers in microprocessor 500 are latching type registers since a full clock cycle interval is allowed for transfers between registers.

The unique architecture of the inventive microprocessor 500 insures that instructions are executed in a minimum number of clock cycles. For example, the loading of the instruction register 501 with the next instruction from memory via data bus 510 can occur at the same time that the results of the last instruction are being written by way of the register bus 520 into the appropriate register. As a result of the unique architecture of the microprocessor 500, all instructions in Table V hereinbelow can be completed in four or less clock cycles. Thus, the inventive microprocessor 500 can be operated at slower speeds to reduce power consumption, while maintaining the through-put necessary for accommodating high-speed, cellular type supervisory signalling.

Another feature of the unique architecture of microprocessor 500 is that interrupts are serviced in a minimum number of clock cycles because general purpose registers 516, condition flags 514 and program counter register 522 include primary and duplicate registers (indicated by primes in FIG. 5). Thus, the primary set of registers 516 and 522 and flags 514 is used during normal operation, and the duplicate set is used during interrupts. By utilizing duplicate registers 516 and 522 and duplicate condition flags 514, a considerable amount of processing time is saved since microprocessor 500 does not have to store the contents of the registers and condition flags before transferring to the interrupt service subroutines. Thus, during an interrupt, the duplicate registers 516 and 522 and duplicate condition flags 514 are used by microprocessor 500, while the contents of the primary registers and flags remain unchanged. After processing the interrupt, microprocessor 500 switches back to the primary registers 516 and 522 and flags 514, returning to normal operation in at most two clock cycle intervals.

Another feature of the unique architecture of microprocessor 500 is that the R0, R1, R2 and R3 registers 516 and 531 may be directly controlled by the control program in ROM 103 in FIG. 1. Of the R0, R1 and R2 registers 516, the R1 and R2 registers are multipurpose registers which can be used as address pointer or data registers, and the R0 register is a single purpose register which can be used as a data register only. R3 register 531 is also a special purpose register, whose four least significant bits are used for page addressing when accessing data from ROM 103 or RAM 104 in FIG. 1 and whose four most significant bits are used to control the four direct I/O lines 540.

Another feature of the unique architecture of microprocessor 500 is that seven levels of subroutine nesting are allowed. For each level of nesting, the subroutine return addresses are saved in a stack, addressed by stack pointer counter 503 and located in the upper sixteen bytes of page zero of RAM 104 in FIG. 1. These locations of RAM are reserved for access only by jump to subroutine JSR and return from subroutine RTS instructions (see Table V hereinbelow). When using the rest of the instruction set of microprocessor 500, accessing these locations of RAM will result in activation of the I/O enable line to data interface unit 105 rather than the RAM enable line to RAM 104 in FIG. 1. This operation of microprocessor 500 is utilized to uniquely address up to sixteen different I/O devices, such as data interface unit 105 in FIG. 1, when the I/O enable line is activated.

The unique architecture of microprocessor 500 also provides for two condition flags 514, the zero flag and carry flag. The zero flag is set to a binary one state if the result of an arithmetic operation in ALU 513 is zero, and it is otherwise cleared to a binary zero state. The carry flag has a binary one state if a carry has resulted from an arithmetic operation in ALU 513 or if a high order binary one bit has been shifted out of ALU 513 during a shift operation. Microprocessor 500 includes four conditional jump instructions, JEQ, JNE, JCC, JCS (see Table V hereinbelow), for responding to the binary zero or one state of the zero and carry flags 514.

According to another unique feature of the architecture of microprocessor 500, serial data bus circuitry 560 provides bidirectional communications between microprocessor 500 and a number of interface adapters 107-112 in FIG. 1 by way of serial data bus 550. Sixteen-bit data signals are loaded into registers 535 and 536 and applied according to a self-clocking transmission scheme by format generator 537 to serial data bus 550 for transmission to the interface adapters. The particular interface adapter addressed by the sixteen-bit data signal transmits a return data signal on the serial data bus 550, which is loaded into register 536 while the last eight bits of the sixteen-bit data signal are being transmitted. Data transmission on the serial data bus 550 is completely under control of microprocessor 500, which polls the various interface adapters on a time available basis. Since the self-clocking transmission scheme is insensitive to speed and timing variations, microprocessor 500 can interrupt data transmission on the serial data bus for long periods of time (seconds, minutes, etc.) without affecting the transmission or reception of the data signals. The data bus circuitry 560 and the self-clocking transmission scheme are described in further detail in the aforementioned co-pending application Ser. No. 187,303, now U.S. Pat. No. 4,369,516.

The instruction repertoire of microprocessor 500 is shown in Tables V, VI and VII hereinbelow. The microprocessor has six addressing modes, immediate, direct, pointer, inherent, extended and register, each of which is described in Table VII. These addressing modes give the microprocessor a great amount of flexibility, resulting in more efficient and simpler control programs. A control program is included in Table VIII, hereinbelow, which is loaded into ROM 103 in FIG. 1 for enabling the microprocessor to control the operation of a portable radiotelephone in a cellular radiotelephone system of the type described in the aforementioned Motorola Instruction Manual 68P81039E25 and in the aforementioned Motorola developmental cellular system application.

Referring to FIG. 6, there is illustrated a generalized flowchart of the control program stored in ROM 103 in FIG. 1 and included in Table VIII hereinbelow. The various tasks of the microprocessor for controlling either a portable or mobile radiotelepone can be divided into primary tasks 601–609 and secondary tasks 610–617. The primary tasks 601–609 are handled on a high priority basis by the microprocessor, while the secondary tasks 610–617 are handled on a lower priority basis due to the fact that they occur infrequently and are less critical to system operation. Referring to the primary tasks, the microprocessor goes through a start-up sequence at block 601 where all circuitry and program constants are initialized. Next, after the power start-up is complete, an initialization phase is entered at block 602. During the initialization phase, all sigalling channels are scanned for the one having the strongest signal, and system parameters are then received on the strongest signalling channel. Also, a determination is made as to whether the radiotelephone is in its home cell or is roaming. When the initialization is complete, the microprocessor enters an idle state at block 603, corresponding to the inactive period when the radiotelephone is on-hook and the signalling channel is being monitored for pages. Periodically, the microprocessor returns back to the initialization block 602 and rescans all of the signalling channels to insure that the radiotelephone is always monitoring the strongest signalling channel.

From the idle state of block 603, the microprocessor can proceed to block 604 if the radiotelephone user initiates a call, block 605 if the microprocessor receives a page on the signalling channel, or block 606 if the microprocessor receives an order on the signalling channel. If a program timer expires while executing the tasks in blocks 604, 605 or 606, the microprocessor returns back to the initialization block 602 for rescanning the signalling channels and returning to the idle state at block 603. If after the origination sequence is complete at block 604, the microprocessor may then proceed to block 608 to enter the conversation phase. Then, once the conversation phase is complete, the microprocessor proceeds to block 609 to release the call. Upon completion of the release of the call, the microprocessor then proceds back to the initialization block 602.

After receiving a paging sequence at block 605, the microprocessor responds to the page and alerts the radiotelephone user of an incoming call at block 607. If the call is to be aborted, a release request causes the microprocessor to proceed to block 609 to release the call. If the radiotelephone user answers the call, the microprocessor proceeds to block 608 for the conversation phase. Upon completion of the conversation phase, the microprocessor proceeds to block 609 and releases the call as described hereinabove.

During the order response sequence at block 606, the microprocessor responds to various orders received on the signalling channel and, upon completion of the appropriate response, returns to the initialization phase at block 602.

During the time that the primary tasks 601–609 are being handled by the microprocessor, the various secondary tasks 610–617 may also be underway. Each of the secondary tasks 610–617 may be underway during the primary tasks identified in the lower right-hand corner of each of the secondary task blocks. Thus, the transmission and reception of supervisory data signals in block 610 may occur during any of the primary tasks 602–608. Supervisory data signals are communicated between the microprocessor and the radio unit 120 via data interface unit 105 and synchronization unit 106 in FIG. 1. It may also be necessary to vary the magnitude of the RF power output in block 611 during primary tasks 602–609. The microprocessor controls the magnitude of the radiated RF power from radio unit 120 by way of interface adaptor 108 in FIG. 1. If the particular radio unit 120 has two antennas 121 for the purposes of diversity, the microprocessor controls the diversity switch in block 612 for selecting between the two antennas. The diversity switch control task 612 may be initiated during any of the primary tasks 602–609. The microprocessor must also accommodate the user interface, including the display 140, keyboard 150 and off-hook switch 170 in FIG. 1, during any of the primary tasks 602–609. The microprocessor controls the display 140, keyboard 150 and off-hook switch 170 by way of the keyboard and display interface adapter 112 in FIG. 1. It may also be necessary to process the autonomous time-out task 614 during the primary tasks 602–609. During the autonomous time-out task 614, a remote watchdog timer is reset. The remote watchdog timer is used to turn off the radiotelephone transmitter when it times out, protecting against a microprocessor failure causing the transmitter to be permanently on. The microprocessor may process the identification task 615 during any of the primary tasks 603–606. The identification task involves the transmitting of the serial number and telephone number of the particular radiotelephone back to the radiotelephone central control station. The microprocessor accesses the serial number memory 130 and telephone number memory 131 by way of interface adapters 110 and 111 in FIG. 1 to obtain the serial and telephone numbers. The microprocessor also handles the interruption task 616 during the primary tasks 607 and 608. An interruption of the call may be required in order to process hand-off or higher priority calls. Also during primary tasks 607 and 608, the microprocessor must handle the voice channel supervision task 617, which involves both hand-off of the radiotelephone to another radio channel and control of the received and transmitted audio signals. The microprocessor is coupled to the radio unit 120 by interface adapters 107, 108 and 109 for controlling the received and transmitted audio signals and transceiver frequencies of radio unit 120 in FIG. 1.

Referring to the radiotelephone 100 in FIG. 1, the microprocessor 101, data interface unit 105, synchronization unit 106, interface adapters 107–111 and keyboard and display interface adapter 112 can each be constructed of conventional integrated circuit devices, such as the CMOS devices described in the CMOS Integrated Circuits Book, published by Motorola Semiconductor Products, Inc., Austin, Tex., 1978. Furthermore, each of these blocks of radiotelephone 100 can be constructed with electrical circuit devices suitable for integration into a semiconductive substrate, such as CMOS, and provided in a single integrated circuit device.

In summary, an improved radiotelephone includes a unique microprocessor system for accommodating high-speed supervisory control signals on a high priority basis and radio transceiver control signals on a low speed time available basis. The radiotelephone microprocessor is coupled by a data interface unit and synchronization unit to the radio transceiver for transmitting and receiving supervisory control signals thereby on a prioritized interrupt basis and is coupled by a self-clocking serial data bus to the radio transceiver, serial and telephone number memories, keyboard and display for controlling the operation thereof on a polled time available basis. The improved radiotelephone can be substantially adapted to operate in any selected radiotelephone system by tailoring the microprocessor control program to meet the specifications of the selected system.

TABLE VI

REGISTER-TO-REGISTER INSTRUCTIONS

All register-to-register instructions are two bytes long and are coded according to the table below:

| Source | R0 | R1 | R2 | R3 | |
|---|---|---|---|---|---|
| 1st Byte | 90 | 94 | 98 | 9C | |
| Destination | R0 | R1 | R2 | R3 | OP CODE |
| 2nd Byte | 80 | 84 | 88 | 8C | LDA |
|  | A0 | A4 | A8 | AC | CMP |
|  | B0 | B4 | B8 | BC | ADD |
|  | C0 | C4 | C8 | CC | BIT |
|  | D0 | D4 | D8 | DC | AND |
|  | E0 | E4 | E8 | DC | XOR |
|  | F0 | F4 | F8 | FC | ORA |

TABLE VII

ADDRESS MODES

Immediate
The second byte of the instruction contains the operand.
Direct
The second byte of the instruction contains the low 8 bits of the memory address. The high 4 bits are determined by the contents of the least significant 4 bits of R3.
Pointer
R1 or R2 contains the low 8 bits of the memory address. The high 4 bits are determined by the contents of the least significant 4 bits of R3.
Inherent
Does not require memory address.
Extended
First and second byte of instruction combines to form a 12-bit address for both conditional and unconditional jumps.
First Byte: OP3, OP2, $A_{11}$, $A_{10}$, $A_9$, $A_8$, OP1, OP0
Second Byte: $A_7$, $A_6$, $A_5$, $A_4$, $A_3$, $A_2$, $A_1$, $A_0$
Register-to-Register
The operation is between the designated source and

TABLE V

BASIC INSTRUCTIONS

| NMEMONIC | FUNCTION | HEXADECIMAL FORMATS |
|---|---|---|
| ADD | Add | B0-BB |
| AND | AND | D0-DB |
| BIT | Bit test | C0,C4,C8,CC |
| CLC | Clear carry | 4D |
| CLI | Clear interrupt mask | 2D |
| CLR | Clear | 8D,8F,01,05,09 |
| CMP | Compare | A0,A4,A8,AC |
| COM | Complement (1's) | ED,EE,EF,61,65,69 |
| DEC | Decrement | AD,AE,AF,21,25,29 |
| INC | Increment | 9D,9E,9F,11,15,19 |
| JCC | Jump if carry clear | 02 |
| JCS | Jump if carry set | 00 |
| JEQ | Jump if equal zero | 40 |
| JMI | Jump indirect | BD,BE,BF,31,35,39 |
| JMP | Jump unconditional | 03 |
| JNE | Jump if not equal zero | 42 |
| JSR | Jump to subroutine | 43 |
| LDA | Load immediate or from RAM | 80-8C |
| LOD | Load from ROM | 91,92,93,95,96,97,99,9A,9B |
| ORA | Inclusive or | F0-FC |
| PAG | Load $A_{12}$ address bit | 6D=SET,7D=RESET |
| ROL | Rotate left | CD,CE,CF,41,45,49 |
| ROR | Rotate right | DD,DE,DF,51,55,59 |
| RTI | Return from interrupt | 2D |
| RTS | Return from subroutine | 0D |
| SDO | Send data to serial data bus | 71,75,79 |
| SEC | Set carry | 5D |
| SEI | Set interrupt mask | 3D |
| SNO | Test serial bus activity | 1D |
| STA | Store accumulator | C1-CB |
| SUB | Subtract | A1-AB |
| XOR | Exclusive OR | E0-EC |

TABLE VII-continued

ADDRESS MODES

Designation registers with the result going into the destination register.

TABLE VIII

ROM DATA

| ADDRESS | DATA |
|---|---|
| 0000 | 393D8CE08CCF010B031A172E176C1788179B176C1B251B2D1B2D1F1B821B9236 |
| 0020 | 1BF1231B23272354236F23EA23F82710277A278A278F4127A627B827C727DA2B |
| 0040 | 174E2B5D2B662BC02BC82BCF2F1B532F822F905A2F9E2FA82FEE613303330E33 |
| 0060 | 3B66337133A86B2F262F2909378FAAAAAAAAAAAAAAAAAAAAAAAAAAAAF12C1C2C3C4 |
| 0080 | C5C600761FAAAAAAAAF12D9DADBDCDDDE008520AAAAAAAB89DFC1C2C3C4C5C6 |
| 00A0 | 009A1FC7C8C9CACBCC00A320CDCECFD0D1D200AC21D3D4D5D6D7D800B522D9DA |
| 00C0 | DBDCDDDE00BE23507F51FF52FF535454FF55F056FF572048F700021200000000 |
| 00E0 | 0000000000000000000000000000000000000000000000000000000000000000 |
| 0100 | 6D81F2D1F341045941042441062 38DF29D1385114418AD118510441EAD104106 |
| 0120 | 239D142D8586442B8DF12D8925C925974440A4C0063BD43FB42586C5F19D252D |
| 0140 | AD244448199B072DB8029B8005C1248B462D81F3D0BFC1F32D81F085F3C40244 |
| 0160 | A4856BE548C41046938856B96C8790D4F3C3B8058394F0D7C3B805F7C7816AA0 |
| 0180 | 044693B805C7A16C46938436C5F357769D0B2D9D6C896CA80546A38D6CED6B46 |
| 01A0 | A39D6A2D8459A51106A3896AB96BC3896B46BDC56C8059C1118001C172817285 |
| 01C0 | 7494C044DCB86D857394C044D08F07DC87B56CC7A45A06DCE174C1744DCD729D |
| 01E0 | 6B816BA00546F781F3C04044EF8DF18574A41F44F84FEC2D9D0B81F3F001C1F3 |
| 0200 | 2DBCFF099794B0194A04CC0F4A01A0004A7E88EF8198A0E24A228199A0B84A22 |
| 0220 | 8897988480FFC3A34A7EB8FF08249E824A7EB4FF082E80E2C19880B8C19988C7 |
| 0240 | 971993197FA1A8D94A40FC208D7A8021C17B884984034B83814BC00248648080 |
| 0260 | F149C149884584044B83882C84054B83884B84144B83A000489880E07FA13DDC |
| 0280 | 7F0B7EC50F845781 7B7F51C3B17AC17A9D7B19AD0F4A870D854B814C7366C54B |
| 02A0 | C14C94F0487A854D814E7366C54DC14E94F0487A883184054B8380E07F51D0F0 |
| 02C0 | C38825853281314DCD36CD35CD34CD3345410AD8E053E490294AC8087EA0004A |
| 02E0 | 7EC5328136C00F4A7E57EE8148C16B80AEC1F3C1F18002C1102D01114AFB57EE |
| 0300 | 3D81104A7E8156A0AE4A7E017F61DCDF7F16AD1780817F8F77B58593D40FE54F |
| 0320 | 4E188594E5504E18804 17F8F9D009D0A7F108009C10C2D810BC0014C3F4F8181 |
| 0340 | 144C688D149D159D788188115D01F4E538816834C57AF19A81D4E53811E4E66 |
| 0360 | 811D4C68AD1DAD1E890C850D9D0D93C10C824C689084D40F4D452594B843000F |
| 0380 | 37D0C0C10B85F3C40252368D738D748005C172C16B846CB56B8AB97380FFC183 |
| 03A0 | 8073C1848184B08D0EAC9D83C1848583736698A04CBF1198A04CBF0CA4AD72CD |
| 03C0 | 74AD6B4E958172A003100C9D738408A5734E8D80EFC17388718390A40EE49084 |
| 03E0 | 8173C174295DDD730CD985748D6B8851800190C44CFDB80541A0104EF2C96AC1 |
| 0400 | 7390E4C57481F3D0FEC1F30DA0054EEA808E735088518D0F018761B805D3D7B8 |
| 0420 | FBE3B805C3F50FC50FD10FA8651219C3B8EDA85612168567C57C8568C57D8569 |
| 0440 | C57E881C856581664DCD7ECD7DCD7C41451257E453E09029524894F890F85087 |
| 0460 | 73668805C97C8801D40F5270A001508155511278E40AE09C4D491268AD7C5266 |
| 0480 | 0D8464B57CEACA8001C18781F3C002542D811152978D0B8165A0C010F7A08010 |
| 04A0 | DBA04010B18585562B53C2562B9D871729850B562B53C2562D8080C10B80FAC1 |

TABLE VIII-continued

ROM

| AD-DRESS | DATA |
|---|---|
| 04C0 | 110DE145D00F562D8566E54656 2D8567E547562D8168E148D0F00D850BC4805 4 |
| 04E0 | 2B856645414541E12FD03F562BE530D4F0562B9D8713AD8168D0305420B0F054 |
| 0500 | 2DB0F05419850BC440542B5729 8804C97584658004B86D3BB209571 1804013BB |
| 0520 | 09570F850BC480562D9D878D0B0D8916564A818CD0DFF0407F8F18854488D00 |
| 0540 | FC20275B8805C9167F84017F7C57EE88088F29A80056518D868802C9009D0389 |
| 0560 | 4BC983894CC9848015C1820D8103562D800CC1199D0080B68D6B8D6C8D6A8456 |
| 0580 | 8E15A4655680 17F0679F569481 19562D11C1000D80B4C1199D000D679FA00256 |
| 05A0 | 8C816EE14AD0FE56F3816DE149D00F56F35B758D85816FD03CB01C8480C57B85 |
| 05C0 | 7554D08173D080C17B8172D0F8B008515151D01FC182B17BC17B854D894E8185 |
| 05E0 | 54E6854B894CC583C9849D009D038033C1F30D5B665A0581768577C178C57980 |
| 0600 | 20C18517B5816EE179D0FE5A1F816DE178D00F5A1F81788579C176C57717FF81 |
| 0620 | 6D856E1B7D679F548C0781796679FA002568C5B66583F8100A008542E17988D |
| 0640 | 009D01818CD0DFB1857F8F817558578173D07F11C17A0D8170856F41454145D4 |
| 0660 | 0FB415C57A0D816EE177D0FE562D816DE176D00F0D8149854AC176C577C178C5 |
| 0680 | 790D807DC1168404C5198002C10180407F86891954448916 5AA2B0801444C101 |
| 06A0 | AD16818858AA80411BC4679F542D8404C51921542D215ABF816FC04056440D21 |
| 06C0 | 5AC9·8021C1028D01D8165A0B0162D6FF658EDA07058E9A050562D801EC11280 |
| 06E0 | 01C1098050C11E8D1D80111BC480A11BC4FC2084458827 8 0047BB28800848081 |
| 0700 | 02C0405C19F408B410C92 2893ED80F5C1788BEC92 2B41088B5C91FC920C92189 |
| 0720 | 6FC8805C33A0115C33F404B41088ACC920C91FA0215C4DC0405C458949C8805E |
| 0740 | 4589855C4DF402B41088A3C91FC526D4708126C0025C5D812C6314C12C8126C0 |
| 0760 | 045C6981326314C13289225C79813 86314C13881 3ED00FC13E058102A0115E8C |
| 0780 | 856845454545D40380D51F8E8055C12E812DD0F094B0C12D88F0C91885186073 |
| 07A0 | 894B854CC983C584897AC982897BC8805EC0D87FC90E8584A50EC5841CC0AD83 |
| 07C0 | 8102D0F01111C1029D03882A80F0D3C3C17C2983C17E2983C17D8024C10EB8FE |
| 07E0 | 871983B8034DCF29CF29CF191941451EF5E453E090AD0E5EE57366C719C3857E |
| 0800 | B8FEC7857D29C7857CB802F7C7B806A8485ECC0DD00FB4F094B00D8103562D80 |
| 0820 | 10C11A9D021776679F6231811A562D1F9C8565E480A440162D01C430604C801F |
| 0840 | C420604C8063C410604C807CC1448009C1199D0201854F5555D43F94B05555D4 |
| 0860 | 0F94B04D5594B04D5594B0C110274685186279C0405444275B679F60818009C1 |
| 0880 | 1981195C9C8110562D81F2C00162AC7F778036C1F3577601854F4D5594B04D55 |
| 08A0 | 94B0555555D40794B0C1100D80107F7C8894C9258005C124842D81F2C001608F |
| 08C0 | 2562BA8076C1F381F2C001608F8525A49C62C781F2C00162DC9D020D8525A49C |
| 08E0 | 62D38524A40462D3238F81F3C040562D57768019C110274685 10562D8D187F77 |
| 0900 | 8102A01754448009C1198050C11A2746C040642385 8 66238450C51A57EE804A |
| 0920 | C1020D851A662CB0FCC1020D679F64498409C519A004562D8165A0B0244F8002 |
| 0940 | C10757EE8D119D020D8119562D1F9C6FF68902C8406475A040666D84028001C1 |
| 0960 | 09C5128005C11D804BC10217EEA090562D84FA275DA03054440D8507562D8D02 |
| 0980 | C02064879D040D9D060D811A54440D818866976F2F17448109562D8D88174481 |

TABLE VIII-continued

| AD-DRESS | ROM DATA |
|---|---|
| 0EA0 | 8B414141D078B092C80478BD848D90888008C10E82C31519AD0E7AB40D908488 |
| 0EC0 | 8D7BB03F128D38848D88397BB0819478F08404800988404DCF29217AD8257AD3 |
| 0EE0 | 813878D18440884282C32529A43B7AE881887AF89D883F8B8106A002562D8119 |
| 0F00 | 562D8082C1060D888D8F19A8957E090D7F07810A542D8894844083C0F07C2DA0 |
| 0F20 | C03E25B0F0A0B03C2FA0A03E2FE0A0C00F7C44C0087C46C0047C3C21C0017E46 |
| 0F40 | C0027C46E00A7FA11529A4457E1A0D84D17FA11D7E5371C0800DF1893F6161D1 |
| 0F60 | 8985EAD0ED94F0C1898595562D8453E0743FA1F18A3F7C801061D18A8455C18A |
| 0F80 | E0F03FA1801061D18C3F8F8010F18CC18C85887E9FC0027C9FC0807E9F800384 |
| 0FA0 | 481D7EA1717150D434F5059524947485420313937392042592 04D4F544F524F4C |
| 0FC0 | 412C20494E432EAA4A2E534D4544494E47484F464620564552 53494F4E203220 |
| 0FE0 | 30394E4F5631393739000000000000000000000000000000000000000000 |

We claim:

1. A radiotelephone comprising, in combination:
serial data bus means for carrying bidirectional data signals, said data bus means including two forward data signal lines together carrying self-clocking data signals and including a return data signal line for carrying return data signals;
keyboard means including a plurality of keys;
display means including a plurality of display elements;
keyboard and display interface means coupled to the serial data bus means, keyboard means and display means for receiving data signals from the forward data signal lines and applying the received data signals to the elements of the display means, sampling the keys of the keyboard means and applying a return data signal representative of the sampled keys to the return data signal line;
a radio transceiver having a transmitter for transmitting audio signals and a receiver for receiving audio signals, said radio transceiver further including frequency synthesizing means responsive to a frequency control signal for providing the transmitting and receiving frequencies of the radio transceiver and including audio control means responsive to audio control signals for attenuating audio signals transmitted by and received by the radio transceiver;
radio interface means coupled to the serial data bus means and radio transceiver for receiving data signals including frequency control signals and audio control signals from the forward data signal lines and applying the received frequency control signals and audio control signals to the radio transceiver for controlling the transmitting and receiving frequencies and transmitted and received audio signals of the radio transceiver;
processing means coupled to the serial data bus means for applying to the forward data signal lines data signals for display in the elements of the display means and data signals for controlling the frequency synthesizing means and audio control means of the radio transceiver, and receiving from the return data signal line data signals representative of the sampled keys of the keyboard means.

2. The radiotelephone according to claim 1, further including memory means for storing a predetermined serial number and predetermined telephone number assigned to said radiotelephone and memory interface means coupled to the memory means and serial data bus means for receiving memory address signals on the forward data signal lines and applying data signals read out from locations of the memory means addressed by the address signals to the return data signal line, said processing means applying memory address signals to the forward data signal lines and receiving from the return data signal line data signals representative of the read-out serial number and telephone number.

3. The radiotelephone according to claim 1, further including means coupled to the radio transceiver for decoding coded data signals received by the receiver of the radio transceiver and for coding data signals to be transmitted by the transmitter of the radio transceiver, said processing means coupled to the data decoding and coding means for applying data signals to be transmitted thereto including data signals representative of the sampled keys of the keyboard and for generating in response to data signals received thereby frequency control signals.

4. The radiotelephone according to claim 3, wherein said processing means is coupled to the radio transceiver by a plurality of control lines, said processing means applying control signals to said control lines for enabling the radio transceiver.

5. The radiotelephone according to claim 4, wherein said radio transceiver includes means for detecting audio signals to be transmitted and applying an indication signal to the control lines when audio signals have been detected, said processing means responsive to the indication signal for applying a transmitter enable signal to the serial data bus means for enabling the transmitter of the radio transceiver.

6. Control circuitry for a radio including a keyboard having a plurality of keys, a display having a plurality of display elements, and a transmitter and receiver having frequencies selected by frequency select signals and having audio control circuitry responsive to audio con- TABLE VIII-continued

ROM

| ADDRESS | DATA |
|---|---|
| 09 A0 | 878D87D0FF0D9D038014C11085838184C57FC1808D8117EE9D038110B014C110 |
| 09 C0 | 818485836B220D8110562D7F4F66BA81F2C002562D81F19D030D81F2C002562D |
| 09 E0 | 8583898481F1A18126F2C57FC980B181C181AD826807AD84A80066FEAD83F584 |
| 0A 00 | 68078002C1030D9D038180857F6B228028C11080FF3FA18110562D7F4F6A098D |
| 0A 20 | 030D6A28A086162DA4036A2EA020142D8861C90EB4FCB0972A3B15AD0EB05068 |
| 0A 40 | 3A2A4415A4006A3B890E84517F51EC409880EC407F51EC8010EEC800D8002C1 |
| 0A 60 | 0488C8C9190D810821562D8119 6C98679F542D8165A0B02ABB6FF6A0306C1FA0 |
| 0A 80 | A0688AA0107606801EA001C112810668978D068D887F848414C5198404C50484 |
| 0A A0 | 01C509800AC11D8D1E80F4C18657F08480818AF010D01F94F03F7C9D079D040D |
| 0A C0 | 8107562D11C1040D8119562D9D040D810821562D818868E09D066F2F8D042F06 |
| 0A E0 | 09095444679F542D8165A0B0162D6FF6A0306AFE8006C1048014C1192F04A060 |
| 0B 00 | 6E0D6B5D6F2F80B057F08D860DA0A068A3A0107606801EC1122BA38119562D9D |
| 0B 20 | 058D048D060D8D1B11851DF51E6E3A800485066E36018D093F61851B6E61E080 |
| 0B 40 | C109851288FFA4026E4C880885046C588828C0806E588878C91BC0806E65013F |
| 0B 60 | 61C080542D8112542DA113142D8D13818961D08085046C7EF06085EB3F63F040 |
| 0B 80 | 3F617F846F2F6BA98048A118C1189D058118562D8D088D057B926F2F17448D16 |
| 0B A0 | 80047F5A9D0633BE850825562DC0806CCF81F3C0406EC56BA98011C1188039C1 |
| 0B C0 | 197F842FCF8118 6ECF800AC1166FE481886C1F679F542D8165A0B028796FE49D |
| 0B E0 | 079D060D8002C1067F8B73BE2F068107562D11C1060D8167D0018568D4F0C50E |
| 0C 00 | B10E0D80756BAB8032C1119D070D81111562D816685674541D0037F7C80047F5E |
| 0C 20 | 80306F089D078D088165D030C1818060217230816885 6773662B0D8110562D7F |
| 0C 40 | 4F72338D079D0880D2C11A80907F7301C1118851C96A8001C173C1748D6B8031 |
| 0C 60 | C1F380B017F0555 1555155515551D40F0D73C6A8006C988506A402562D858ACC |
| 0C 80 | 1072908084C11CF4CF65542D80F03F73811C729CC430542D80303F79A00C142D |
| 0C A0 | C420542D80A03F7973C681F3C040562DAD08734B810470BEA0056A5D2BA98084 |
| 0C C0 | C11C80603F7381F2C00272FC81F1851070F884AC898170DEB4CEB8F072D894A0 |
| 0C E0 | 32F8B4CE94A030F880C8C11A810670F8810972F880047F5A8020C110891AA8C0 |
| 0D 00 | 142D80043F5E85047647A0807631811 6542D843888268 0057BB2098480813ED0 |
| 0D 20 | 0FC13E7429888584A08126D00F94B0376E8850841EA050744D88A08402A04074 |
| 0D 40 | 4D84FAA090744DA070562D3757C512C91E8D1D8401C509841473664D5551555F4 |
| 0D 60 | 55C127C5288055C129C12A09809AC126C91F5FCA8504767A6FE4056BB1FC8080 |
| 0D 80 | 05C124886EC9259D088D86807417F0814F51CD50DD4F41D080E14FC14F8D0D81 |
| 0D A0 | 8AE0087F7C8197D07F74E7A07376B580807F8D9D97898B851776BE09C98BA486 |
| 0D C0 | 34CB818C61D00274CB7F8D84C07F517A1E890A74EF859690E4D42074FBC196C0 |
| 0D E0 | 2076F37B9237FB818CD07F7F8F37B3C19637FB858876FB7BC58196C040542D81 |
| 0E 00 | 95780B8D957F1281893F6D818CC002542D8100F101542D8109562DDCDF0DFC20 |
| 0E 20 | 9D9580A0F1EA7F6D8096C11780027F867F53001F7846A00D3862A00B3842C802 |
| 0E 40 | 7A9FC8017A4C7F078801C98B842088944DCF2925C4077A51C4FF7A4EF194C194 |
| 0E 60 | 3F128D8B850A542DB0F378C521789721788C217889217892B0E990884D99215 |
| 0E 80 | A37A7E92C3F0A03F6D8804A809F802C98B0D8D888D170D8801C98B88903F188D | trol signals for controlling the attenuation of audio signals transmitted and received by the radio, said control circuitry comprising:

serial data bus means for carrying bidirectional data signals, said data bus means including two forward data signal lines together carrying self-clocking data signals and including a return data signal line for carrying return data signals;

keyboard and display interface means coupled to the data bus means, keyboard and display for receiving data signals from the forward data signal lines and applying the received data signals to the display elements, sampling the keys of the keyboard means and applying a return data signal representative of the sampled keys to the return data signal line;

radio interface means coupled to the data bus means and radio for receiving data signals including frequency control signals and audio control signals from the forward data signal lines and applying the received frequency control signals and audio control signals to the radio for controlling the transmitting and receiving frequencies and transmitted and received audio signals of the radio; and processing means coupled to the data bus means for applying to the forward data signal lines data signals including data signals for display in the elements of the display and data signals for controlling the transmitting and receiving frequencies and transmitted and received audio signals of the radio, and receiving from the return data signal line data signals representative of the sampled keys of the keyboard.

7. The control circuitry according to claim 6, further including memory means for storing a predetermined serial number and predetermined telephone number assigned to said radio and memory interface means coupled to the memory means and serial data bus means for receiving memory address signals on the forward data signal lines and applying data signals read out from locations of the memory means addressed by the address signals to the return data signal line, said processing means applying memory address signals to the forward data signal lines and receiving from the return data signal line data signals representative of the read-out serial number and telephone number.

8. The control circuitry according to claim 6, further including means coupled to the radio for decoding coded data signals received by the receiver of the radio and for coding data signals to be transmitted by the transmitter of the radio, said processing means coupled to the data decoding and coding means for applying data signals to be transmitted thereto including data signals representative of the sampled keys of the keyboard and for generating in response to data signals received thereby frequency control signals.

9. The control circuitry according to claim 8, wherein said processing means is coupled to the radio by a plurality of control lines, said processing means applying control signals to said control lines for enabling the radio.

10. The control circuitry according to claim 9, wherein said radio includes means for detecting audio signals to be transmitted and applying an indication signal to the control lines when audio signals have been detected, said processing means responsive to the indication signal for applying a transmitter enable signal to the serial data bus means for enabling the transmitter of the radio.

11. The control circuitry according to claim 6, further including substrate means, said control circuitry being formed of electrical circuit components integrated into the substrate means.

12. A radiotelephone comprising, in combination:

serial data bus means for carrying bidirectional data signals, said data bus means including two forward data signal lines together carrying self-clocking data signals and including another return data signal line for carrying return data signals;

keyboard means including a plurality of keys;

display means including a plurality of display elements;

keyboard and display interface means coupled to the serial data bus means, keyboard means and display means for receiving data signals from the forward data signal lines and applying the received data signals to the elements of the display means, and sampling the keys of the keyboard means and applying a return data signal representative of the sampled keys to the return data signal line;

a radio transceiver having a transmitter for transmitting audio signals and coded data signals and a receiver for receiving audio signals and coded data signal, said radio transceiver further including frequency synthesizing means responsive to a frequency control signal for providing the transmitting and receiving frequencies of the radio transceiver and including audio control means responsive to audio control signals for attenuating audio signals transmitted by and received by the radio transceiver;

radio interface means coupled to the data bus means and radio transceiver for receiving data signals including frequency control signals and audio control signals from the forward data signal lines and applying the received frequency control signals and audio control signals to the radio transceiver for controlling the transmitting and receiving frequencies and transmitted and received audio signals of the radio transceiver;

means coupled to the radio transceiver for decoding coded data signals received by the receiver of the radio transceiver and for coding data signals to be transmitted by the transmitter of the radio transceiver; and processing means coupled to the data bus means for applying to the forward data signal line data signals for display in the elements of the display means and data signals for controlling the frequency synthesizing means and audio control means of the radio transceiver, and receiving from the return data signal line data signals representative of the sampled keys of the keyboard means, and said processing means further coupled to the data decoding and coding means for applying thereto data signals including data signals representative of the sampled keys of the keyboard and for generating in response to data signals received thereby frequency control signals.

13. Control circuitry for a radio including a keyboard having a plurality of keys, a display having a plurality of display elements, and a transmitter and receiver, said control circuitry comprising:

serial data bus means for carrying bidirectional data signals, said data bus means including two forward data signal lines together carrying self-clocking data signals and including a return data signal line for carrying return data signals;

keyboard and display interface means coupled to the data bus means, keyboard and display for receiving data signals from the forward data signal lines and applying the received data signals to the display elements, sampling the keys of the keyboard means and applying a return data signal representative of the sampled keys to the return data signal line; and processing means coupled to the data bus means for applying to the forward data signal lines data signals including data signals for display in the elements of the display, and receiving from the return data signal line data signals representative of the sampled keys of the keyboard, and said processing means further being coupled to the radio by at least one control line for controlling the operation thereof.

* * * * *